US010963272B1

(12) United States Patent
Kim et al.

(10) Patent No.: US 10,963,272 B1
(45) Date of Patent: Mar. 30, 2021

(54) SYSTEMS AND METHODS FOR DEPLOYING LOW-APPLICATION-IMPACT USER INTERFACES

(71) Applicant: Coupang Corp., Seoul (KR)

(72) Inventors: Tae Ho Kim, Seoul (KR); Sang Ryul Kim, Sungnam (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/924,373

(22) Filed: Jul. 9, 2020

(51) Int. Cl.
*G06F 9/451* (2018.01)
*G06F 40/143* (2020.01)
*G06F 9/445* (2018.01)

(52) U.S. Cl.
CPC .......... *G06F 9/451* (2018.02); *G06F 9/44505* (2013.01); *G06F 40/143* (2020.01)

(58) Field of Classification Search
CPC ..... G06F 9/451; G06F 40/143; G06F 9/44505
See application file for complete search history.

(56) References Cited

U.S. PATENT DOCUMENTS

| | | | | |
|---|---|---|---|---|
| 2005/0198247 A1* | 9/2005 | Perry | ................... | H04L 7/0008 709/223 |
| 2006/0074942 A1* | 4/2006 | Shaburov | .............. | G06F 16/217 |
| 2009/0292514 A1* | 11/2009 | McKim | .................. | G06F 30/20 703/6 |
| 2011/0088011 A1* | 4/2011 | Ouali | ....................... | G06F 8/10 717/105 |
| 2011/0154287 A1* | 6/2011 | Mukkamala | ............. | G06F 8/30 717/105 |
| 2014/0067910 A1* | 3/2014 | Zhong | ................... | G06F 16/957 709/203 |
| 2014/0173454 A1* | 6/2014 | Sanchez | .................... | G06F 8/20 715/747 |
| 2014/0180970 A1* | 6/2014 | Hettenkofer | ........... | G06N 5/025 706/11 |
| 2014/0281909 A1* | 9/2014 | Pinto | ..................... | G06F 16/958 715/234 |
| 2014/0282227 A1* | 9/2014 | Nixon | ................. | G06F 3/04855 715/786 |
| 2016/0092176 A1* | 3/2016 | Straub | ................... | G06F 3/0486 717/107 |
| 2017/0242950 A1* | 8/2017 | Cockrell | ................. | H04L 41/08 |
| 2018/0239622 A1* | 8/2018 | Gebauer | .................. | G06F 8/38 |
| 2019/0205103 A1* | 7/2019 | Yadav | ....................... | G06F 8/30 |
| 2020/0004598 A1* | 1/2020 | Brebner | ................ | H04L 67/141 |
| 2020/0151384 A1* | 5/2020 | Warila | .................. | G06F 40/151 |

\* cited by examiner

*Primary Examiner* — Tadesse Hailu
(74) *Attorney, Agent, or Firm* — Finnegan, Henderson, Farabow, Garrett & Dunner, LLP

(57) ABSTRACT

Disclosed herein are systems and methods for a mobile device for deploying a user interface layer. The mobile device may comprise a memory storing instructions and at least one processor configured to execute instructions to perform operations. These operations may comprise receiving a user interface view request; accessing view configuration data in response to the user interface view request; generating a user interface view based on the view configuration data; accessing expression data; binding the expression data to the view configuration data to create bound data; and generating a user interface using the bound data.

19 Claims, 5 Drawing Sheets

SYSTEMS AND METHODS FOR DEPLOYING LOW-APPLICATION-IMPACT USER INTERFACES

TECHNICAL FIELD

Exemplary embodiments generally relate to systems and methods for deploying a user interface layer. For example, disclosed techniques may include binding the expression data to the view configuration data to generate a user interface layer. Other techniques may include accessing view configuration data from a remote device.

BACKGROUND

Conventional user interface systems typically rely on software updates to change the visual appearance of elements within an application. Often, users must initiate the downloading and installation of an application update in order to see or experience new features. In many cases, while an application is undergoing a software update, some or all features of the application may be disabled to a user. Sometimes, a user may be unable to perform an application update due to having hardware and/or software that is outdated and cannot support the update. Thus, a user may not be able to see or otherwise experience new features of an application, which may involve new visual elements. Software updates can also be slow to deploy and require considerable bandwidth, even when changes to visual aspects of an application may be small. Moreover, application updates often require a degree of approval by a manager of an application store, further delaying deployment to users.

In view of these deficiencies of conventional user interface systems, there is a need for improved systems and methods for deploying a user interface layer. The disclosed system and methods address one or more of the problems set forth above and/or other problems in the prior art.

SUMMARY

Consistent with the present embodiments, one aspect of the present disclosure is directed to a mobile device for deploying a user interface layer. The mobile device may comprise a memory storing instructions and at least one processor configured to execute instructions to perform operations. These operations may comprise receiving a user interface view request; accessing view configuration data in response to the user interface view request; generating a user interface view based on the view configuration data; accessing expression data; binding the expression data to the view configuration data to create bound data; and generating a user interface using the bound data.

In another embodiment, the operations may comprise displaying the generated user interface at the mobile device.

In another embodiment, the generated user interface may be displayed within an application running on the mobile device and having operation code; and the operation code of the application may be a same version of operation code while the at least one processor performs the operations.

In another embodiment, the user interface view request may be received in response to a user input within an application running on the mobile device.

In another embodiment, the mobile device may comprise a network interface; the accessed view configuration data may be accessed from a cache at the user device; and the cache may be updated using view configuration update data received by a network interface of the user device.

In another embodiment, the view configuration data may be expressed at least in part using Extensible Markup Language (XML).

In another embodiment, the expression data may comprise multiple expression data elements; and binding the expression data to the view configuration data may comprise: extracting expressions from the view configuration data, matching an expression data element to an extracted expression, and generating, as part of the bound data, a user interface element based on the matching.

In another embodiment, the generated user interface may comprise the generated user interface element.

In another embodiment, the view configuration data may comprise at least one of: user interface element position data, user interface element dimension data, or conditional user interface element display data.

In another embodiment, each expression data element may comprise at least one of: a text string, font information, color information.

In another embodiment, the generated user interface element may be configured to allow for user interaction comprising an input at the mobile device.

In another embodiment, the mobile device may comprise a network interface and accessing the view configuration data may comprise: determining, via the network interface, that a remote server stores the view configuration data; determining the mobile device lacks the view configuration data; requesting, via the network interface, the view configuration data; and receiving, via the network interface and in response to the request, receiving the view configuration data from the remote server.

Yet another aspect of the present disclosure is directed to a method for generating a user interface layer. The method may comprise receiving a user interface view request; accessing view configuration data in response to the user interface view request; generating a user interface view based on the view configuration data; accessing expression data; binding the expression data to the view configuration data to create bound data for coordinating the display of a user interface; and generating the user interface using the bound data.

In another embodiment, the method may comprise displaying the generated user interface.

In another embodiment, the generated user interface may be displayed within an application having operation code; and the operation code of the application may a same version of operation code when the view request is received and when the generated user interface is displayed.

In another embodiment, the view configuration data may be expressed at least in part using Extensible Markup Language (XML).

In another embodiment, the expression data may comprise multiple expression data elements; and binding the expression data to the view configuration data may comprise: extracting expressions from the view configuration data, matching an expression data element to an extracted expression, and generating, as part of the bound data, a user interface element based on the matching.

In another embodiment, the generated user interface may comprise the generated user interface element.

In another embodiment, the generated user interface element may be configured to allow for user interaction.

Yet another aspect of the present disclosure is directed to a mobile device for deploying a user interface layer. The system may comprise a network interface; a display device; at least one processor; and a non-transitory computer-readable medium containing a set of instructions that, when executed by the at least one processor, cause the at least one processor to perform operations. The operations may comprise receiving a user interface view request at the display device; determining, via the network interface, that a remote server stores the view configuration data; determining the mobile device lacks the view configuration data; requesting, via the network interface, the view configuration data; receiving, via the network interface and in response to the request, the view configuration data from the remote server; accessing expression data comprising multiple expression data elements and stored at the mobile device; extracting expressions from the view configuration data; matching an expression data element to an extracted expression; generating, by binding a matched expression data element to a matched extracted expression, an interactive user interface element based on the matching; generating, using the bound data, a user interface having the interactive user interface element; and displaying, at the display device, the user interface.

Consistent with other disclosed embodiments, exemplary embodiments of non-transitory computer readable storage media may store program instructions, which may be executed by at least one processor device and perform any of the methods described herein.

The foregoing general description and the following detailed description provide exemplary embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The disclosure is generally directed to automated systems and processes for coordinating the analysis, transmission, and management of dispute data.

Reference will now be made in detail to exemplary embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
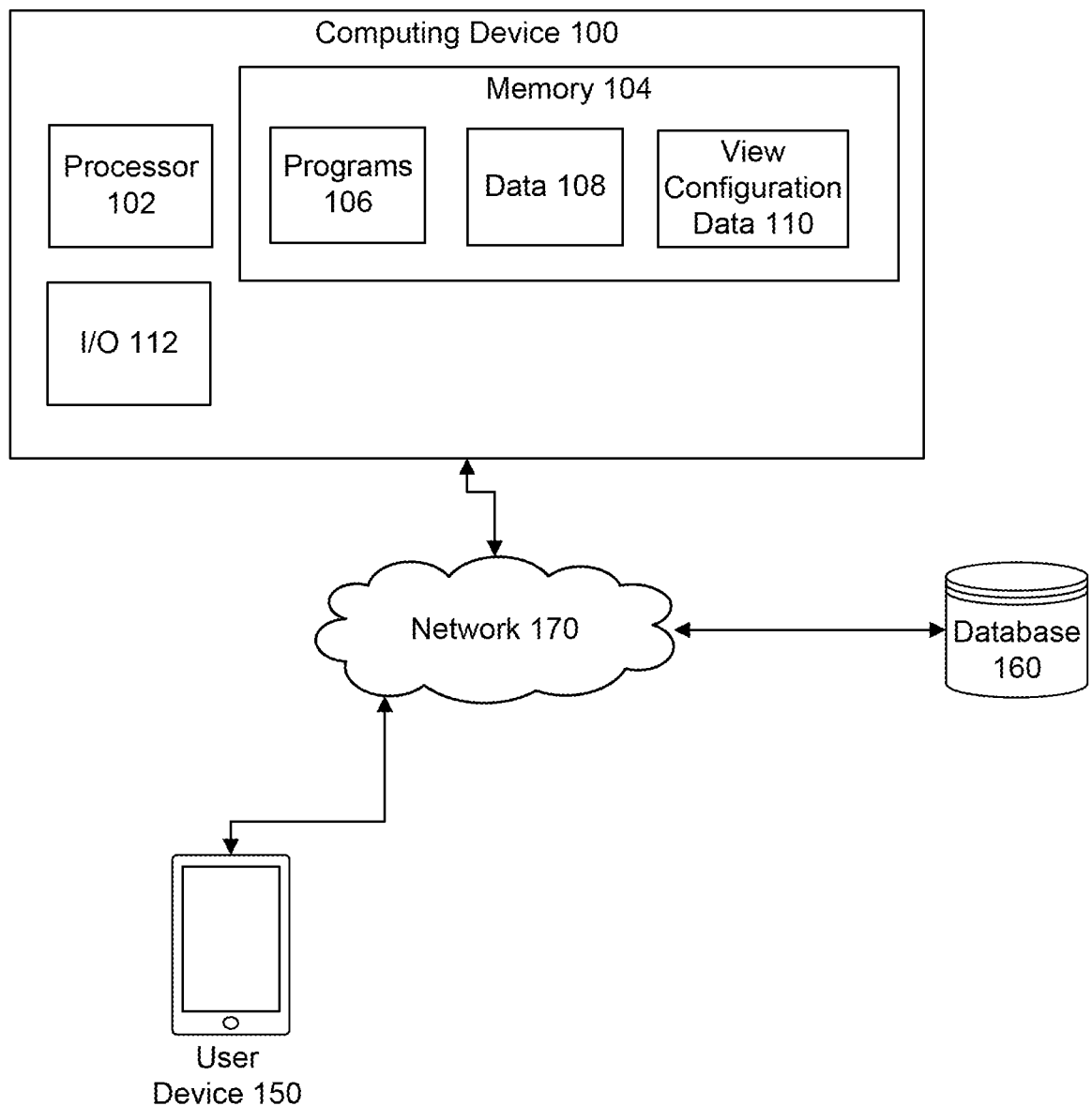
FIG. 1 illustrates an exemplary pictographic representation of a system for deployment of user interface data, consistent with disclosed embodiments.

FIG. 1 illustrates an exemplary pictographic representation of system 10, which may include a computing device 100 configured to carry out processes discussed herein. In some embodiments, computing device 100 may be associated with a software developer, company, and/or other entity involved with creating user interfaces. In some embodiments, system 10 may include multiple computing devices 100 communicably connected to each other within a local network (e.g., through network interface 120). Computing device 100 may include a processor 102, which may include one or more dedicated processing units, application-specific integrated circuits (ASICs), field-programmable gate arrays (FPGAs), graphical processing units, or various other types of processors or processing units coupled with memory 104. Processor 102 may constitute a single-core or multiple-core processor that executes parallel processes simultaneously. For example, processor 102 may be a single-core processor configured with virtual processing technologies. In some embodiments, processor 102 may use logical processors to simultaneously execute and control multiple processes. Processor 102 may implement virtual machine technologies, or other known technologies to provide the ability to execute, control, run, manipulate, store, etc., multiple software processes, applications, programs, etc. In another embodiment, processor 102 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 102 may execute various instructions stored in memory 104 to perform various functions of the disclosed embodiments described in greater detail below. Processor 102 may be configured to execute functions written in one or more known programming languages.

Computing device 100 may also include memory 104, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 104 may include any number of hard disks, random access memories (RAMs), read-only memories (ROMs), erasable programmable read-only memories (EPROMs or Flash memories), and the like. Memory 104 may include one or more storage devices configured to store instructions usable by processor 102 to perform functions related to the disclosed embodiments. Memory 104 may also include any number of programs, applications, application program interfaces (APIs), or any other data, consistent with the disclosed embodiments.

In some embodiments, memory 104 may contain a number of application program interfaces (APIs), examples of which are shown in FIG. 1. Memory 104 may store programs 106, which may include one or more programs (e.g., APIs, processes, modules, code, scripts, or functions) used to perform methods consistent with disclosed embodiments. Programs 106 may be written in one or more programming or scripting languages. Memory 104 may also maintain data 108, which may include data associated with a user account, an application, a particular device, a model, a communication, or any other data related to generating a user interface layer. Data may be exchanged with a computing device 100 or between devices (e.g., multiple computing devices 100, a computing device 100 and a user device 150, etc.) in accordance with any format or protocols, including XML, REST, SOAP, JSON, GraphQL, and the like.

Memory 104 may also include view configuration data 110, which may be used to generate user interface layers, consistent with disclosed embodiments. In some embodiments, view configuration data 110 may be user-configured, computer-configured (e.g., according to a model), or partially user-configured and partially-computer configured. View configuration data 110 may be configured for displaying a user interface layer (e.g., formatted for inflating, expression extraction, model binding), consistent with disclosed embodiments.

Memory 104 may also include a model (not shown), which may be an artificial intelligence (AI) model for generating user interface layers, consistent with disclosed embodiments. A model may be, without limitation, any one of a computer software module, an algorithm, a machine-learning model, a data model, a statistical model, a recurrent neural network (RNN) model, a long-short term memory (LS™) model, or another neural network model, consistent with disclosed embodiments. In some embodiments, a model may be a model in a learning stage or may have been trained to a degree (e.g., by a developer, a machine, or a combination of both). In some embodiments, a developer may interact with a model to approve or disapprove of suggested changes to a model or parameters of a model (e.g., suggested by a machine). After this interaction, the model may be updated to reflect the user interactions and/or machine inputs.

Computing device 100 may also include input/output device (I/O) 112, which may include at least one of a display (e.g., graphical display, textual display, display 164, etc.), an LED, a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver, an input device, an output device, or other I/O device to perform methods of the disclosed embodiments. I/O 112 may include components of an interface (e.g., a user interface). I/O 112 may also include a network interface (not shown), which may include at least one of a wired or wireless network card/chip set.

System 10 may also include network 170, which devices (e.g., computing device 100 and user device 150) may use to connect to each other (e.g., to send and/or receive communications). Network 170 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 170 may be connected to other networks (not depicted in FIG. 1) to connect the various system components to each other and/or to external systems or devices. In some embodiments, network 170 may be a secure network and require a password to access the network.

Figure 2:
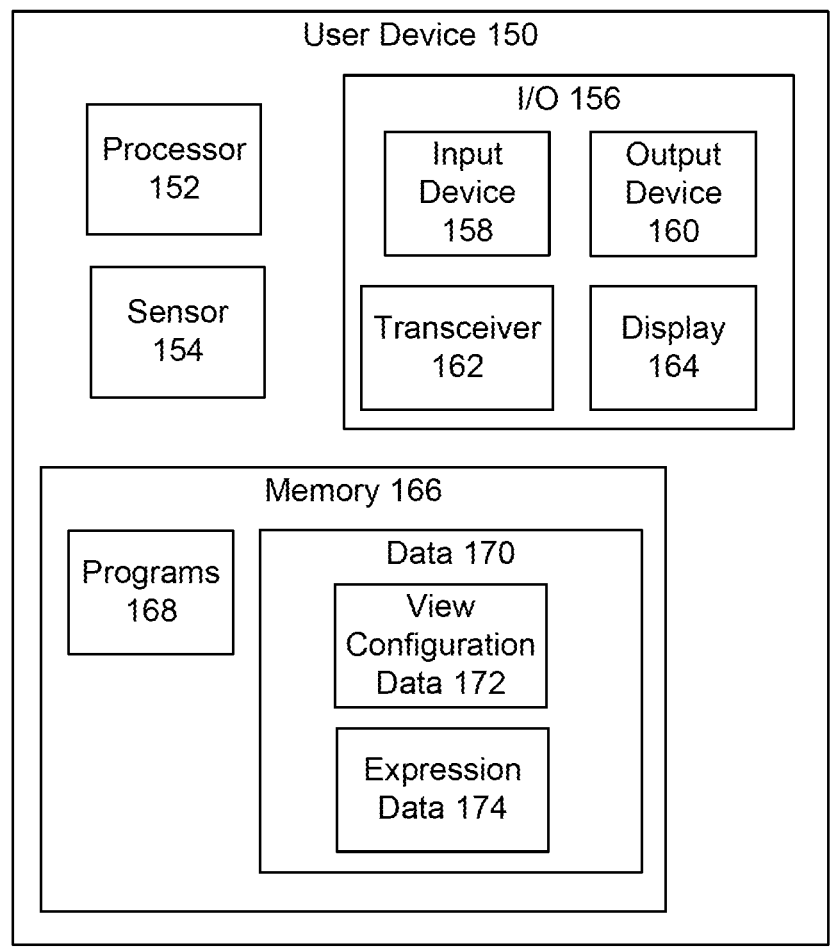
FIG. 2 illustrates an exemplary pictographic representation of a user device for configuring user interface data, consistent with disclosed embodiments.

System 10 may also include a user device 150, discussed further with respect to FIG. 2. In some embodiments, system 10 may include one or more databases 160 configured to store data for use by system 10, consistent with disclosed embodiments. In some embodiments, database 160 may be configured to store datasets and/or one or more dataset indexes, consistent with disclosed embodiments. Database 160 may include a cloud-based database (e.g., Amazon Relational Database Service (RDS)) or an on-premises database. Database 160 may include view configuration data, expression data, datasets, model data (e.g., model parameters, training criteria, performance metrics, etc.), and/or other data, consistent with disclosed embodiments. Database 160 may include data received from one or more components of system 10 and/or computing components outside system 10 (e.g., via network 170).

FIG. 2 illustrates an exemplary pictographic representation of user device 150, which may carry out processes discussed herein. User device 150 may include a processor 152, which may include any or all of the aspects of processor 102, consistent with disclosed embodiments. In some embodiments, user device 150 may include a sensor 154, such as an accelerometer, a light sensor, an audio sensor, an infrared sensor, a motion sensor, a piezoelectric sensor, a laser sensor, a sonar sensor, a GPS sensors, an electromagnetic sensor, and the like.

User device 150 may also include input/output devices (I/O) 156, which may include an input device 158, which may include at least one of a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, or the like. As will be appreciated by one of skill in the art, input device 158 may be any device capable of receiving inputs, including user inputs, to perform or assist in performing methods consistent with disclosed embodiments.

I/O 156 may also include an output device 160, which may include any device configured to provide user feedback, such as a visual display, an LED, a speaker, a haptic feedback device, or the like.

I/O 156 may include a transceiver 162, which may be configured to connect with at least one of any type of data network. For example, transceiver 162 may be at least one of a mobile network transceiver, Wi-Fi transceiver, a LiFi transceiver, Near Field Communication (NFC) transceiver, a radio transceiver, an ultra-high frequency (UHF) transceiver, a Bluetooth transceiver, an infrared transceiver, or other wireless transceiver.

I/O 156 may include a display 164, which may display data or other information associated with the processes described herein. For example, display 164 may include a liquid crystal display (LCD), in-plane switching liquid crystal display (IPS-LCD), light-emitting diode (LED) display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. Display 164 may display graphical interfaces, interactable graphical elements, animations, dynamic graphical elements, and any other visual element.

User device 150 may also include memory 166, which may include any or all of the aspects of memory 104, and which may store instructions usable by processor 152 to perform functions related to the disclosed embodiments. For example, memory 166 may include operation code (e.g., operating system code, application operation code, etc.) according to which an application may run on user device 150. In some embodiments, operation code may be updated using an application store. As another example, memory 166 may store programs 168, which may have any or all of the aspects of programs 106, consistent with disclosed embodiments. For example, programs 168 may include an application configured to display user interface layers. Memory 166 may also include data 170, which may include view configuration data 172, expression data 174, application data, user data, device data, data input by a user at user device 150, or any other data for use in the processes described herein. In some embodiments, data 160 may include data tracked at user device 150 (e.g., by a program 168). For example, a program 168 may track actions taken at user device 150 (a mouse click, button press, touchscreen interaction, transaction initiated, purchase made, webpage viewed, a download, etc.). By way of further example, a program 168 may track (e.g., using a browser extension, cookie, or the like) a user action taken in an Internet browser to view and/or interact with a user interface layer, and may store data containing details of views and/or interactions in data 160.

Figure 3:
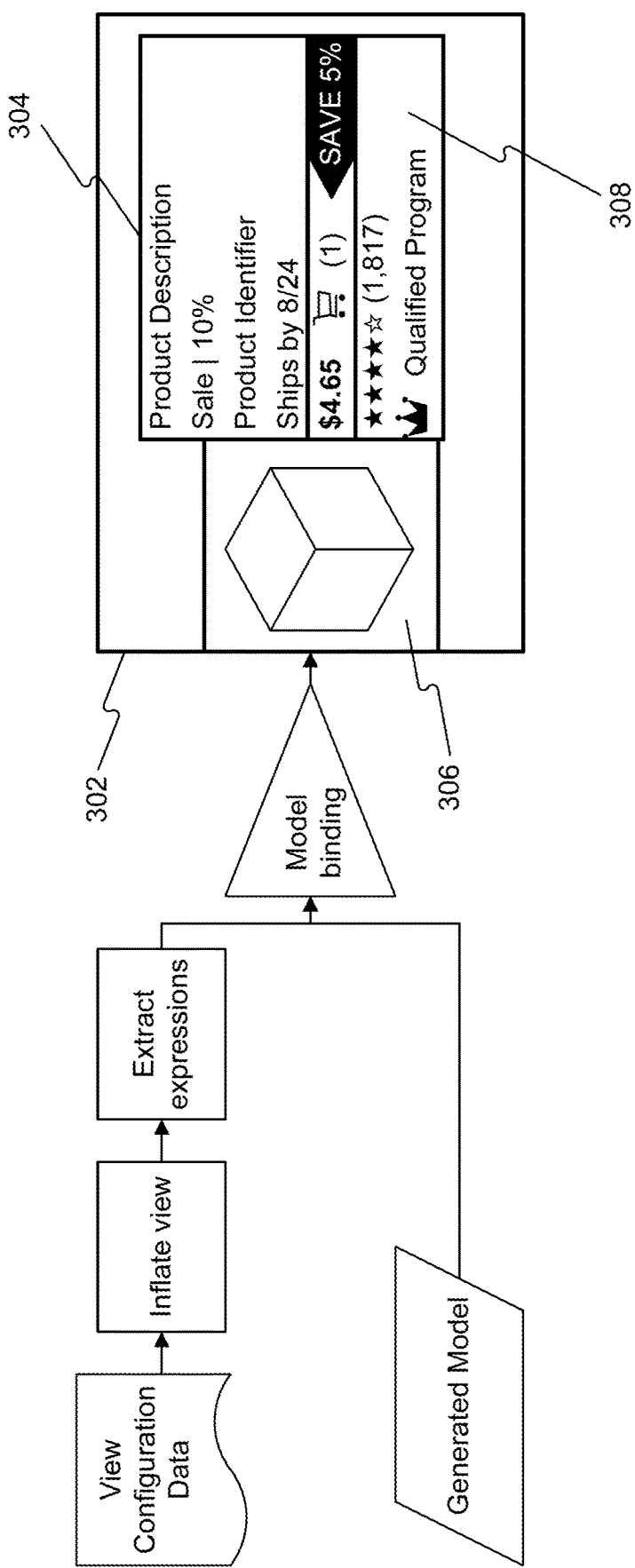
FIG. 3 illustrates an exemplary pictographic representation of a process for binding data to generate a user interface, consistent with disclosed embodiments.

FIG. 3 illustrates an exemplary pictographic representation of a process for binding data to generate a user interface, consistent with disclosed embodiments. FIG. 3 illustrates how view configuration data (e.g., view configuration data 172) may be used to generate user interface layers, which is described further with respect to FIG. 5. In some embodiments, view configuration data may be used to inflate a view. For example, view data (e.g., data for configuring a user interface layer) may be expanded at a device (e.g., computing device 100) to allow for interaction with data elements (e.g., nested data elements, data elements that are part of a hierarchical tree, data elements forming a sequence, and the like). In some embodiments, expressions (e.g., layer content, a layer element dimension, a layer element color, etc.) may be extracted (e.g., by user device 150) from the view configuration data and/or expanded view data. In some embodiments, an action (e.g., "ActionBinder") may be performed (e.g., to extracted expressions and/or other data, prior to applying data to a model). In some embodiments, extracted expressions, view configuration data, and/or expanded view data may be applied to a model, which may have been generated (e.g., at computing device 100) to produce user interface layers at a device (e.g., user device 150). In some embodiments, model binding may occur (e.g., at computing device 100 and/or user device 150), whereby extracted expressions, view configuration data, and/or expanded view data may linked to or otherwise associated with at least one parameter of a model.

In some embodiments, a model having bound data may be implemented at a user device 150 (or other processing device) to generate user interface elements, which may be displayed within a user interface, such as user interface 302. For example, at least one user interface element and/or layer may be positioned in a user interface 302, such as a description area 304. In some embodiments, description area 304 may include text, a graphic, an animation, interactable elements (e.g., a link, a scrollable area, a button, a slide bar, a movable element, an expandable element, etc.), and the like. In some embodiments, an element may be positioned within a particular sub-area 308, where the positioning, sizing, color, display time, type of user interaction permitted, etc. of each element, as well as a combination of elements itself, may be controlled by a model, view configuration data, and/or expressions from view configuration data. By way of example, an element or element configuration may be associated with a particular product. In some embodiments, data, such as a model, model data, view configuration data, and/or an expression may be cached at a device (e.g., user device 150) as discussed further with respect to process 500, to improve processing and reduce bandwidth congestion.

In some embodiments, user interlace 302 may also include a visualization area 306, which may include an image. For example, visualization area 306 may include an image of a product. In some embodiments, an image or other visualization in visualization area 306 may be interactable by a user. For example, a user may rotate, zoom into, zoom out of, select, etc. an image displayed in visualization area 306 (e.g., by inputting a command at input device 158). In some embodiments, a video or other animation may play within visualization area 306.

In some embodiments, an element of a user interlace 302 may be part of a user interface layer. For example, a user interface 302 may have multiple user interface layers, all or some of which may be configured for display, which may be controlled by a model, view configuration data, and/or expressions from view configuration data. A user interface layer may be a logical layer and/or determined by an operating system framework (e.g., Android™). In some embodiments, one layer may be interdependent with another layer (e.g., interdependencies between any combination of view configuration data, a model, and a user interface), such that a modification to one interdependent layer (e.g., according to an update of a model and/or view configuration data) may trigger a change at another interdependent layer (which may be effectuated by a model).

Figure 4:
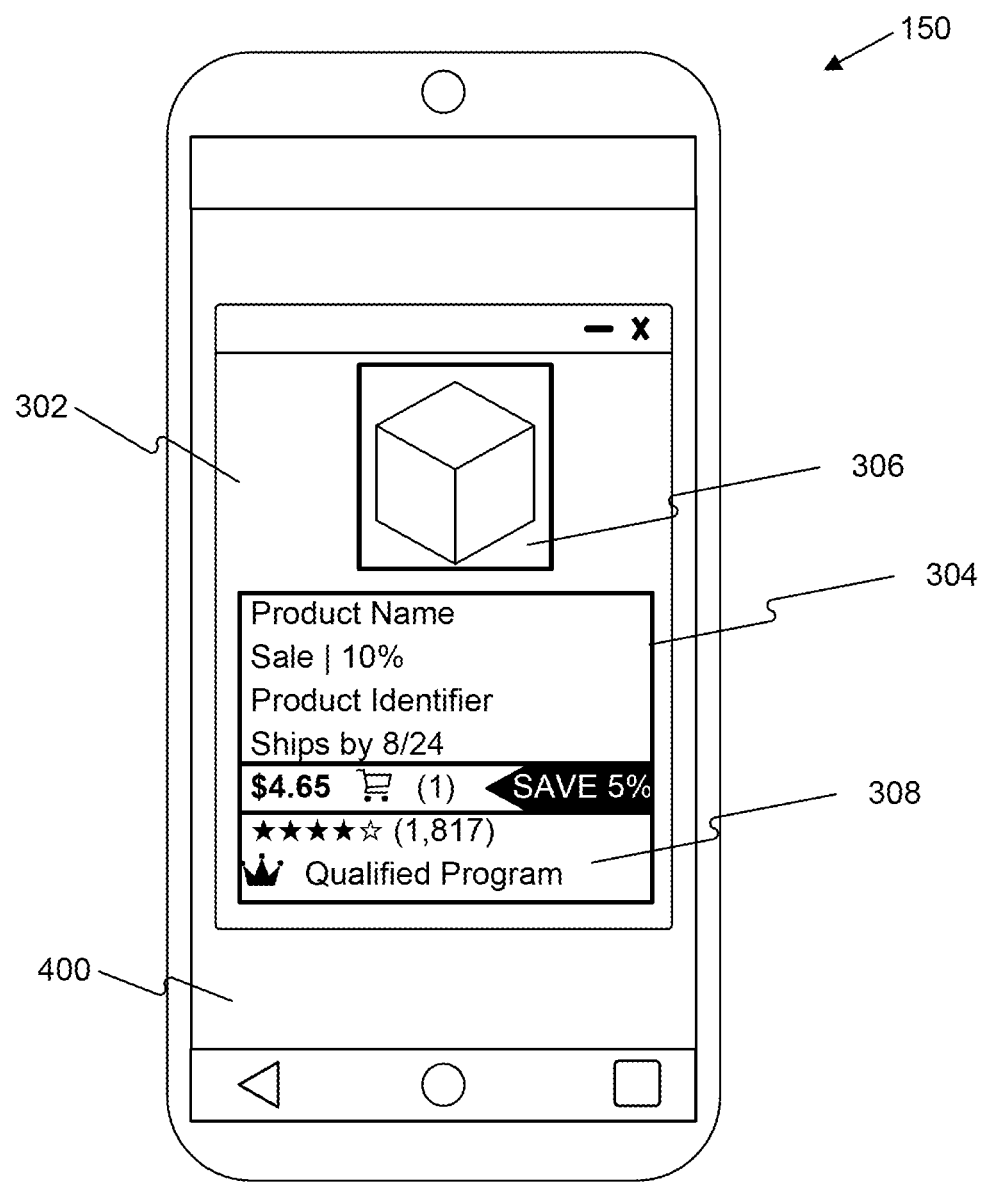
FIG. 4 illustrates an exemplary pictographic representation of a user interface within a mobile application environment, consistent with disclosed embodiments.

FIG. 4 illustrates an exemplary pictographic representation of a user interface within a mobile application environment, consistent with disclosed embodiments. For example, a user interface 302 may be displayed on a user device 150. In some embodiments, user interface 302 may be displayed within a display area 400 of user device 150, which may be designated for displaying application interfaces. In some embodiments, a user interface 302 may have been generated in response to a user input at the user device 150 and/or data received from a remote source (e.g., computing device 100).

Figure 5:
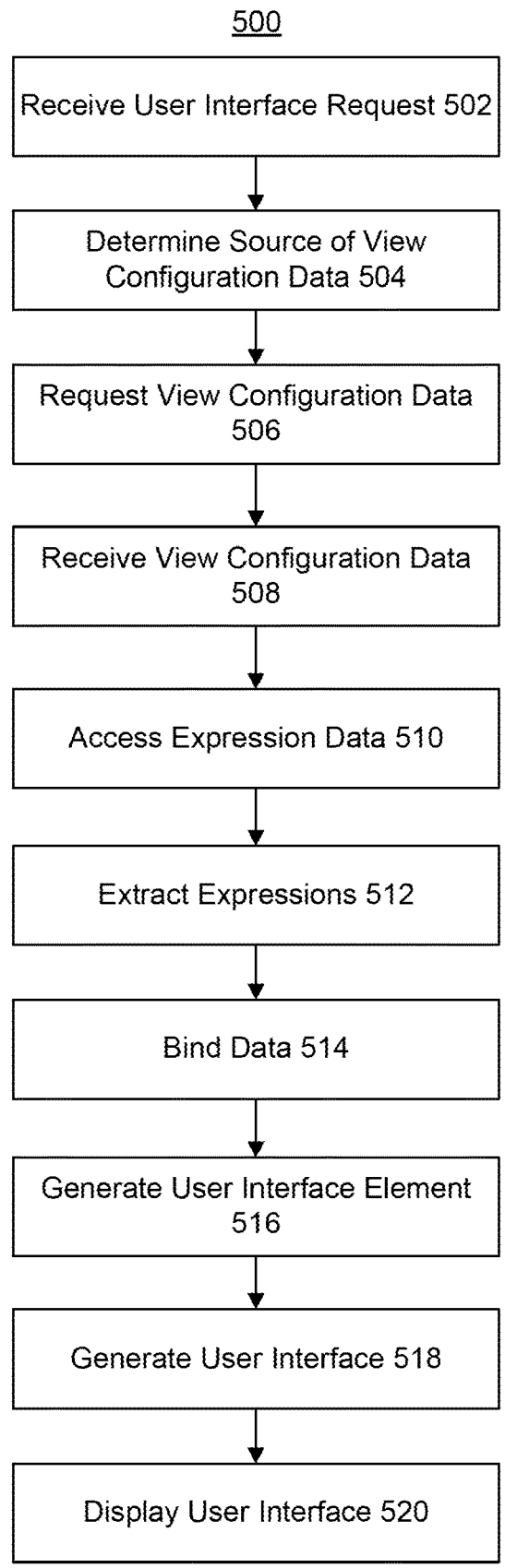
FIG. 5 depicts a flowchart of an exemplary process for deploying a user interface layer, consistent with disclosed embodiments.

FIG. 5 depicts a flowchart of an exemplary process 500 for deploying a user interface layer, which may be performed by a processor in accordance with disclosed embodiments. For example, process 500 may be performed entirely or in part by user device 150 (e.g., using processor 152). Alternatively or additionally, some steps of process 500 may be performed by user device 150 and other steps may be performed by another device, such as computing device 100. While process 500 is described with respect to user device 150, one of skill will understand that the steps illustrated in FIG. 5 are exemplary and steps may be added, merged, divided, duplicated, repeated, modified, and/or deleted in some embodiments.

At step 502, user device 150 may receive a user interface request, which may be a request for a particular user interface and/or user interface element to be generated and/or displayed (e.g., at a user device 150). In some embodiments, a user interface request may be received at user device 150 in response to an input received at a user device 150 (e.g., within an application running on user device 150). For example, when an application is launched at user device 150 and/or when a user interacts with an interface element, processor 152 may receive a user interface request in response.

At step 504, user device 150 may determine a source of view configuration data. For example, user device 150 may determine that user device 150 itself has stored (e.g., at memory 166) view configuration data related to the user interface request. As another example, user device 150 may identify a system and/or device associated with a software developer, application creator, etc. that may have view configuration data related to the user interface request. To further this example, user device 150 may determine (e.g., via a network interface) that a remote device (e.g., server) stores view configuration data and/or may determine that user device 150 itself lacks view configuration data. In response, user device 150 may request (e.g., via the network interface) the view configuration data at the remote device. In response to the request, user device 150 may receive (e.g., via the network interface and/or in response to the request), view configuration data from the remote device. In some embodiments, view configuration data may have a corresponding version, such that user device 150 may determine that view configuration data of a newer version exists at a remote device, and may query the remote device in response to this determination (e.g., as described above).

As yet another example, user device 150 may determine that it is a source of a first portion of view configuration data and that another device (e.g., computing device 100) is a source of a second portion of view configuration data. View configuration data may include a function, a table, a field, an object, user interface element position data, user interface element dimension data, conditional user interface element display data, and/or other data that may be used to generate a user interface element. In some embodiments, view configuration data may expressed at least in part using Extensible Markup Language (XML).

At step 506, user device 150 may request view configuration data. By requesting view configuration data, user device 150 may access view configuration data in response to a user interface view request (e.g., step 502). For example, processor 152 may receive the request and retrieve view configuration data from a cache at user device 150 (e.g., within memory 166). In some embodiments, a cache at user device 150 may be designated for view configuration data and/or expression data, and may be updated using view configuration update data received by a network interface of user device 150 (e.g., transceiver 162). Additionally or alternatively, user device 150 may transmit a request for view configuration data to computing device 100, which may have been determined as a source of view configuration data at step 504. In some embodiments, computing device 100 may receive a view configuration data request as part of a predetermined update scheme (e.g., according to a predetermined interval, upon determining that network bandwidth is below a threshold, upon determining that view configuration data and/or application data on user device 150 is outdated, etc.).

At step 508, user device 150 may receive view configuration data. For example, user device 150 may received the view configuration data requested at step 506 from a computing device 100. In some embodiments, user device 150 may generate a user interface view based on the view configuration data. By way of example, user device 150 may generate a data structure (e.g., according to a model), which may be enhanced using expression data.

At step 510, user device 150 may access expression data. In some embodiments, accessing expression data may include retrieving it from storage of user device 150 (e.g., memory 166). Additionally or alternatively, accessing expression data may include requesting and receiving expression data from a remote device (e.g., computing device 100).

At step 512, user device 150 may extract expressions from expression data (e.g., expression data received at step 510). For example, expression data may include multiple expressions, all or some of which may be extracted, such as according to a model. In some embodiments, an expression may include at least one of: a text string, font information, color information, or other data element that may be bound with view configuration data. In some embodiments, an action (e.g., "ActionBinder") may be performed (e.g., to extracted expressions and/or other data, prior to binding data).

At step 514, user device 150 may bind data. In some embodiments, binding data may include binding expression data to view configuration data, which may result in the creation of bound data, which may include new expressions configured to generate a user interface element and/or layer. In some embodiments, such as those where expression data comprises multiple expression data element, binding data may include extracting expressions from the view configuration data and matching an expression data element to an extracted expression.

At step 516, user device 150 may generate at least one user interface element. For example, user device 150 may generate a user interface element based on bound data created at step 514. A user interface element may include any portion of a description area 304, a visualization area 306, a sub-area 308, or other element capable of display on user device 150. In some embodiments, a generated user interface element may configured to allow for user interaction, such as an input at user device 150 (examples of which are discussed with respect to FIG. 3). As discussed above, a combination of user interface elements may correspond to a user interface layer. In some embodiments, user device 150 may generate a user interface element based on matching performed at step 514. In some embodiments, a generated user interface element may be included as part of the bound data.

At step 518, user device 150 may generate a user interface (e.g., user interface 302). In some embodiments, a generated user interface may include a user interface element and/or layer generated at step 516. In some embodiments, a user interface may include a combination of different user interface layers, which may be configured according to a model, view configuration data, and/or expressions from view configuration data.

At step 520 user device 150 may display a user interface (e.g., at display 164). For example, user device 150 may display a user interface generated at step 518. In some embodiments, a generated user interface may be displayed within an application running on a user device 150 (e.g., a mobile device). And, as discussed above, an application may have operation code, which may allow it to perform operations on user device 150. In some embodiments, operation code of an application (e.g., an application displaying a user interface) may be a same version of operation code while a processor (e.g., processor 152) performs operations, such as executing steps of process 500. In this manner, a device can display updated information (e.g., user interface elements, user interface layers, etc.) without updating operation code of an application, which may require additional bandwidth and/or data storage space. In some embodiments, operation code of an application may remain as a first version of operation code following a performance of all or a portion of process 500.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer programs based on the written description and methods of this specification are within the skill of a software developer. The various functions, scripts, programs, or modules can be created using a variety of programming techniques. For example, computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages (including an object oriented programming language and/or conventional procedural programming language) such as Smalltalk, C++, JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively for any number of iterations, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Moreover, while exemplary embodiments have been described herein, these have been presented for purposes of illustration, but are not intended to be exhaustive or limited to the embodiments disclosed, such that the scope includes any and all embodiments having equivalent elements, modifications, variations, omissions, combinations (e.g., of aspects across various embodiments), adaptations or alterations, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A mobile device for deploying a user interface layer, the mobile device comprising:
　at least one processor;
　a network interface; and
　a non-transitory computer-readable medium containing a set of instructions that, when executed by the at least one processor, cause the at least one processor to perform operations comprising:
　　receiving a user interface view request;
　　accessing view configuration data in response to the user interface view request by:
　　　determining, via the network interface, that a remote server stores the view configuration data;
　　　determining the mobile device lacks the view configuration data;
　　　requesting, via the network interface, the view configuration data; and
　　　receiving, via the network interface and in response to the request, the view configuration data from the remote server;
　　generating a user interface view based on the view configuration data;
　　accessing expression data;
　　binding the expression data to the view configuration data to create bound data; and
　　generating a user interface using the bound data.

2. The mobile device of claim 1, the operations further comprising displaying the generated user interface at the mobile device.

3. The mobile device of claim 2, wherein:
　the generated user interface is displayed within an application running on the mobile device and having operation code;
　the operation code of the application is a same version of operation code while the at least one processor performs the operations.

4. The mobile device of claim 1, wherein the user interface view request is received in response to a user input within an application running on the mobile device.

5. The mobile device of claim 1, wherein:
　the mobile device comprises a network interface;
　the accessed view configuration data is accessed from a cache at the mobile device; and
　the cache is updated using view configuration update data received by a network interface of the mobile device.

6. The mobile device of claim 1, wherein the view configuration data is expressed at least in part using Extensible Markup Language (XML).

7. The mobile device of claim 6, wherein:
　the expression data comprises multiple expression data elements; and
　binding the expression data to the view configuration data comprises:
　　extracting expressions from the view configuration data,
　　matching an expression data element to an extracted expression, and
　　generating, as part of the bound data, a user interface element based on the matching.

8. The mobile device of claim 7, wherein the generated user interface comprises the generated user interface element.

9. The mobile device of claim 8, wherein the view configuration data comprises at least one of: user interface element position data, user interface element dimension data, or conditional user interface element display data.

10. The mobile device of claim 9, wherein each expression data element comprises at least one of: a text string, font information, color information.

11. The mobile device of claim 10, wherein the generated user interface element is configured to allow for user interaction comprising an input at the mobile device.

12. A method for deploying a user interface layer, comprising:
　receiving a user interface view request;
　accessing view configuration data in response to the user interface view request by:
　　determining, via a network interface, that a remote server stores the view configuration data;
　　determining a mobile device lacks the view configuration data;
　　requesting, via the network interface, the view configuration data; and
　　receiving, via the network interface and in response to the request, the view configuration data from the remote server;
　generating a user interface view based on the view configuration data;
　accessing expression data;
　binding the expression data to the view configuration data to create bound data for coordinating display of a user interface;
　generating the user interface using the bound data.

13. The method of claim 12 further comprising displaying the generated user interface.

14. The method of claim 13, wherein:
　the generated user interface is displayed within an application having operation code;
　the operation code of the application is a same version of operation code when the view request is received and when the generated user interface is displayed.

15. The method of claim 12, wherein the view configuration data is expressed at least in part using Extensible Markup Language (XML).

16. The method of claim 15, wherein:
　the expression data comprises multiple expression data elements; and
　binding the expression data to the view configuration data comprises:
　　extracting expressions from the view configuration data, matching an expression data element to an extracted expression, and generating, as part of the bound data, a user interface element based on the matching.

17. The method of claim 16, wherein the generated user interface comprises the generated user interface element.

18. The method of claim 17, wherein the generated user interface element is configured to allow for user interaction.

19. A mobile device for deploying a user interface layer, the mobile device comprising:

a network interface;

a display device;

at least one processor; and a non-transitory computer-readable medium containing a set of instructions that, when executed by the at least one processor, cause the at least one processor to perform operations comprising:

receiving a user interface view request at the display device;

determining, via the network interface, that a remote server stores the view configuration data;

determining the mobile device lacks the view configuration data;

requesting, via the network interface, the view configuration data;

receiving, via the network interface and in response to the request, the view configuration data from the remote server;

accessing expression data comprising multiple expression data elements and stored at the mobile device;

extracting expressions from the view configuration data;

matching an expression data element to an extracted expression;

generating, by binding a matched expression data element to a matched extracted expression, an interactive user interface element based on the matching;

generating, using the bound data, a user interface having the interactive user interface element; and displaying, at the display device, the user interface.

\* \* \* \* \*